United States Patent
Crickmore et al.

(10) Patent No.: US 8,079,261 B2
(45) Date of Patent: Dec. 20, 2011

(54) ACCELEROMETERS

(75) Inventors: Roger Ian Crickmore, Dorchester (GB); John David Hill, Dorchester (GB); John Peter Fairfax Wooler, Dorchester (GB); Peter James Thomas, Hounslow (GB)

(73) Assignee: Qinetiq Limited (GB)

( * ) Notice: Subject to any disclaimer, the term of this patent is extended or adjusted under 35 U.S.C. 154(b) by 834 days.

(21) Appl. No.: 10/586,105

(22) PCT Filed: Jan. 12, 2005

(86) PCT No.: PCT/GB2005/000078
§ 371 (c)(1),
(2), (4) Date: Jul. 14, 2006

(87) PCT Pub. No.: WO2005/068950
PCT Pub. Date: Jul. 28, 2005

(65) Prior Publication Data
US 2008/0229825 A1    Sep. 25, 2008

(30) Foreign Application Priority Data
Jan. 17, 2004   (GB) .................................. 0401053.4

(51) Int. Cl.
*G01P 15/13* (2006.01)
(52) U.S. Cl. .................... 73/514.26; 73/514.16
(58) Field of Classification Search ............. 73/514.26, 73/503, 504.03, 504.04, 504.12, 510, 514.16
See application file for complete search history.

(56) References Cited

U.S. PATENT DOCUMENTS

| | | | | |
|---|---|---|---|---|
| 4,442,350 A | * | 4/1984 | Rashleigh | 250/227.17 |
| 4,495,411 A | | 1/1985 | Rashleigh et al. | |
| 4,516,021 A | * | 5/1985 | Taylor | 250/227.17 |
| 4,534,222 A | * | 8/1985 | Finch et al. | 73/653 |
| 4,613,752 A | * | 9/1986 | Davis | 250/227.19 |
| 4,739,661 A | * | 4/1988 | Bucholtz et al. | 73/514.26 |
| 4,799,752 A | * | 1/1989 | Carome | 385/12 |
| 4,829,821 A | * | 5/1989 | Carome | 73/514.09 |
| 4,893,930 A | | 1/1990 | Garrett et al. | |
| 5,063,781 A | * | 11/1991 | Conforti et al. | 73/651 |
| 5,134,882 A | * | 8/1992 | Taylor | 73/514.26 |
| 5,589,937 A | * | 12/1996 | Brininstool | 356/480 |
| 5,637,865 A | * | 6/1997 | Bullat et al. | 250/227.14 |
| 5,883,308 A | * | 3/1999 | Fersht | 73/514.26 |
| 6,049,511 A | * | 4/2000 | Erath | 367/149 |
| 6,175,108 B1 | * | 1/2001 | Jones et al. | 250/227.14 |
| 6,191,414 B1 | * | 2/2001 | Ogle et al. | 250/227.14 |
| 6,233,374 B1 | * | 5/2001 | Ogle et al. | 385/13 |
| 6,305,227 B1 | * | 10/2001 | Wu et al. | 73/705 |
| 6,363,786 B1 | * | 4/2002 | Fersht | 73/514.26 |
| 6,384,919 B1 | * | 5/2002 | Fersht et al. | 356/477 |
| 6,437,916 B1 | * | 8/2002 | McLeod et al. | 359/489.04 |

(Continued)

FOREIGN PATENT DOCUMENTS
GB    2 386 687    9/1993
(Continued)

*Primary Examiner* — Hezron E Williams
*Assistant Examiner* — Samir M Shah
(74) *Attorney, Agent, or Firm* — McDonnell Boehnen Hulbert & Berghoff LLP

(57) ABSTRACT

A fibre optic accelerometer particularly intended for use with an interferometer using the compliant cylinder approach but further providing a seismic mass at the core of the cylinder resulting in improved sensitivity and rejection of out-of-axis inputs.

14 Claims, 2 Drawing Sheets

U.S. PATENT DOCUMENTS

| | | | | |
|---|---|---|---|---|
| 6,643,299 B1 * | 11/2003 | Lin | ................................ | 372/6 |
| 6,650,418 B2 * | 11/2003 | Tweedy et al. | .............. | 356/477 |
| 6,779,402 B2 * | 8/2004 | Rud et al. | .................. | 73/514.26 |
| 6,955,085 B2 * | 10/2005 | Jones et al. | ................ | 73/514.26 |
| 7,222,534 B2 * | 5/2007 | Maas et al. | ................ | 73/514.26 |
| 7,400,812 B2 * | 7/2008 | Seifert | ........................ | 385/135 |
| 7,406,868 B2 * | 8/2008 | Chernyak et al. | .............. | 73/509 |
| 7,612,886 B2 * | 11/2009 | Guerineau et al. | ............ | 356/477 |
| 7,751,044 B2 * | 7/2010 | Csutak | ........................ | 356/365 |
| 2006/0236762 A1 * | 10/2006 | Meyer | ........................ | 73/514.26 |
| 2006/0257066 A1 * | 11/2006 | Hill et al. | ........................ | 385/12 |
| 2008/0174781 A1 * | 7/2008 | Berthold et al. | .............. | 356/477 |

FOREIGN PATENT DOCUMENTS

| | | |
|---|---|---|
| GB | 2 208 711 | 4/1999 |
| JP | 10104056 | 4/1998 |
| WO | WO 02/10774 | 2/2002 |
| WO | WO 03/081186 | 10/2003 |

* cited by examiner

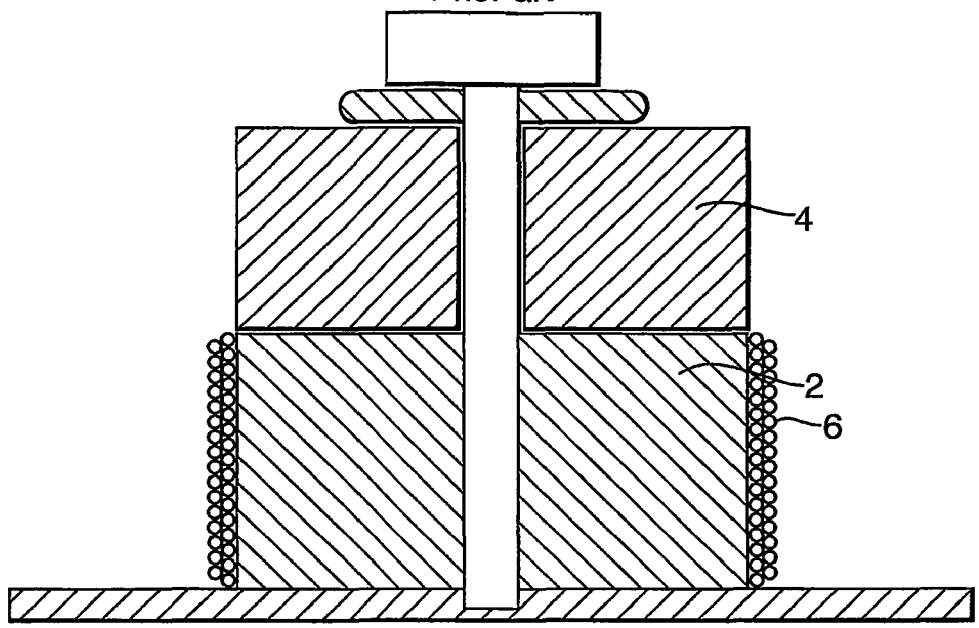
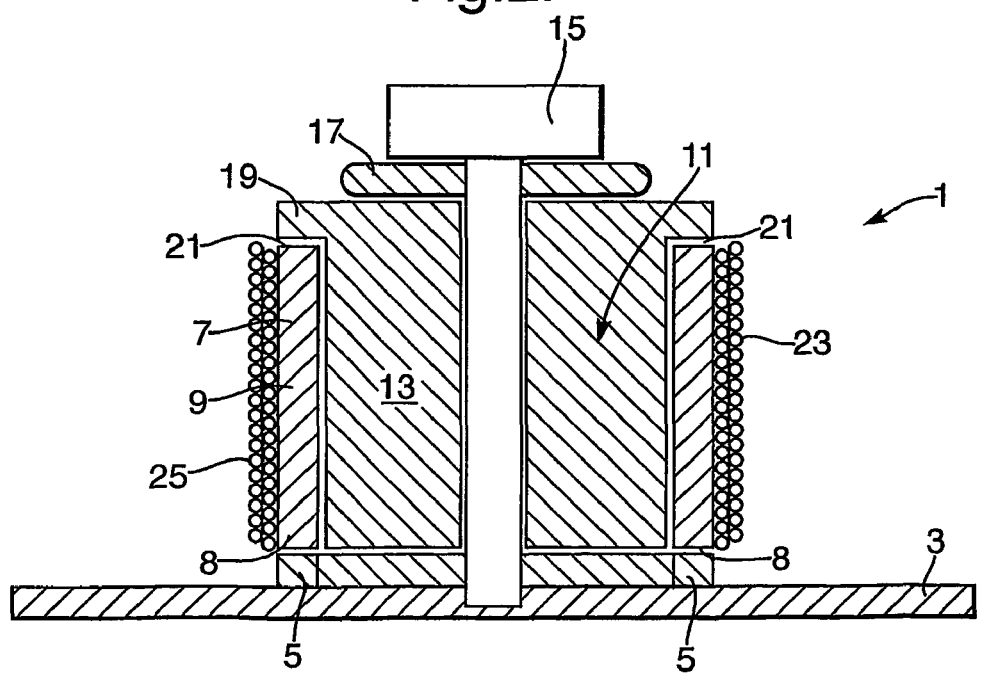

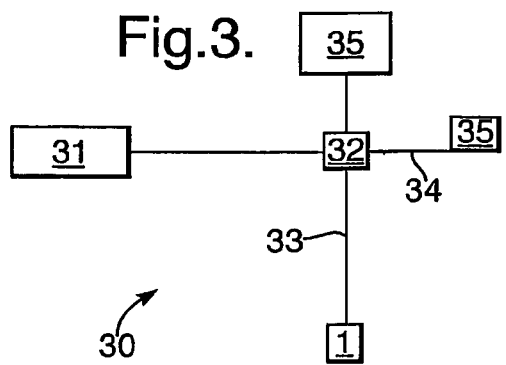
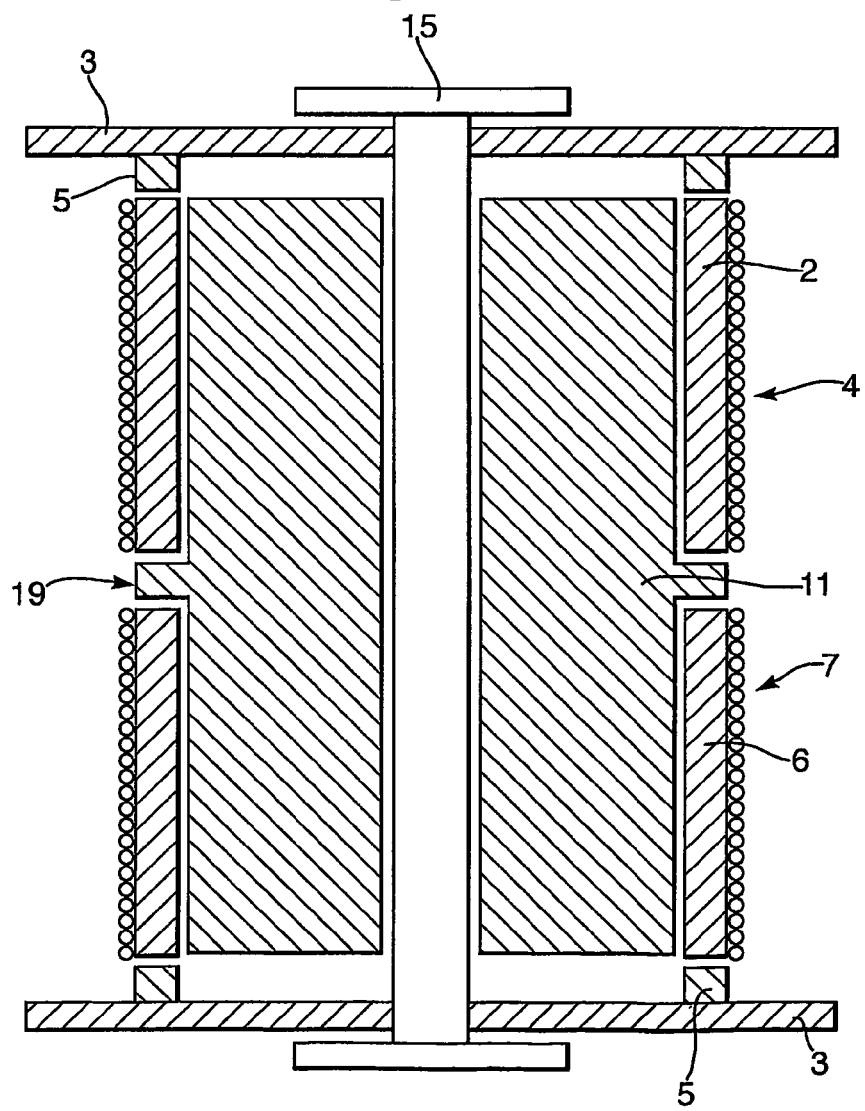

ACCELEROMETERS

BACKGROUND OF THE INVENTION (1) Field of the Invention

The present invention relates to accelerometers and particularly fibre optic accelerometers for use in interferometers.

(2) Description of the Art

The need to monitor extremely low levels of vibration in areas such as security, seismic survey and condition monitoring of machinery and such like has spurred the development of ever more sensitive accelerometers. Fibre optic technology has been applied to this particular field in the form of fibre-optic accelerometers based on interferometric techniques. The compliant cylinder approach to the design of a fibre-optic accelerometer is particularly effective when incorporated in such an interferometer. In one known approach a seismic mass is held in place by two compliant cylinders and around the circumference of each cylinder there being wound a single mode optical fibre, which form the arms of an interferometer. In another approach, a single compliant cylinder 2 loaded with a seismic mass 4 as shown in FIG. 1 is wound circumferentially with an optical fibre 6.

Whilst the abovementioned approaches have found acceptance, there remains a need to increase yet further the sensitivity of the accelerometer beyond that currently achievable and in particular to do so without any increase in component size. The present invention seeks to improve the sensitivity of a fibre wound compliant cylinder accelerometer whilst simultaneously seeking to avoid additional cost and complexity of construction.

SUMMARY OF THE INVENTION

Thus, according to one aspect of the invention, there is provided a fibre optic accelerometer comprising a seismic mass coaxially constrained within a cylinder of compliant material, the cylinder being circumferentially wound with optical fibre.

Preferably, the accelerometer is mounted on a plate which may or may not in practice be an integral part of a platform or structure on which the accelerometer is deployed. Conveniently, a tension member retains the accelerometer against the plate. The tension member may be a bolt or other well known tensioning component. Equally, the tension member may be provided by an enclosure or can acting on the accelerometer. Advantageously, the tension member acts on the accelerometer via a compliant material washer whilst a rigid support ring is interposed between the plate and the cylinder to ensure that relative movement is possible.

It will be recognised that a suitable compliant material for the cylinder will have a relatively low Young's modulus but with a Poisson's ratio close to 0.5, such that the stiffness of the accelerometer arises more from the circumferential winding than the cylinder itself. Thus for a particular force acting on the cylinder, the greater the strain induced in the fibre and hence sensitivity of the accelerometer. Furthermore, by constraining the seismic mass coaxially within the cylinder, the tendency present in prior art devices for the cylinder to buckle or otherwise respond unfavourably to acceleration orthogonal to the cylinder axis is limited. Advantageously, this leads to improved performance of devices incorporating the accelerometer in which sensitivity in a single axis is paramount.

It will be further recognised that by reducing the wall thickness of the cylinder the sensitivity of the accelerometer can be still further increased. Prior art devices have hitherto sought to increase sensitivity either by increasing the seismic mass and/or the height of the cylinder supporting the seismic mass. Both approaches whilst increasing the desired sensitivity may also have the problem of increased sensitivity to orthogonal acceleration mentioned above and will result in an increased accelerometer size. With the trend towards miniaturisation of components, the present invention lends itself to providing improved performance to prior art devices for a given volume and mass.

The invention is also directed to methods by which the described apparatus operates and including method steps for carrying out every function of the apparatus.

In particular according to a further aspect of the present invention then is provided a method of measuring acceleration comprising providing a seismic mass coaxially constrained within a cylinder of compliant material, the cylinder being circumferentially wound with optical fibre, axial displacement of the seismic mass deforming the cylinder so as to vary the stress induced in the optical fibre.

There is also provided a method of measuring acceleration comprising providing a seismic mass coaxially constrained within first and second cylinders of compliant material, each cylinder being circumferentially wound with optical fibre, axial displacement of the seismic mass deforming each cylinder so as to vary the stress induced in respective optical fibres.

The preferred features may be combined as appropriate, as would be apparent to a skilled person, and may be combined with any of the aspects of the invention.

DESCRIPTION OF THE FIGURES

In order to assist in understanding the invention, a particular embodiment thereof will now be described, by way of example and with reference to the accompanying drawings, in which:

FIG. 1 is a cross-sectional side view of a prior art fibre optic accelerometer;

FIG. 2 is a cross-sectional side view of a first fibre optic accelerometer in accordance with the present invention;

FIG. 3 is a schematic view of an optical interferometer incorporating an accelerometer of FIG. 2; and FIG. 4 is a cross-sectional side view of a second fibre optic accelerometer in accordance with the present invention.

DETAILED DESCRIPTION OF THE INVENTION

Referring now to FIG. 2, the fibre optic accelerometer 1 is mounted on a base plate 3 via a rigid support ring 5. The ring 5 can be formed either as a relief in the base plate 3 or perhaps more conveniently, it can be provided as a separate component, thereby allowing differing sizes of accelerometer 1 to be mounted on the base plate 3. The base plate 3 itself is produced from a rigid material, typically steel although other metals and composites may suggest themselves to those skilled in the art. Furthermore, it should be understood that references throughout the description to a base plate are also intended to encompass the direct mounting of the accelerometer to a platform or other structure.

The support ring 5 is in contact with a first end face of a compliant cylindrical member 7. The cylindrical member has relatively thin wall 9 and a coaxial void 11 such that a seismic mass 13 may be received therein. The compliant cylindrical member 7 is formed from a material having a relatively low Young's modulus such that it is capable of deformation under low levels of loading in an axial direction. Typically, a rubber or rubber like material may be utilised. Such materials also have a Poisson ratio approaching a maximum of 0.5 meaning that an efficient transfer of axial stress into circumferential stress in the cylinder 7 can take place. Ideally the inner surface of the cylinder and outer surface of the seismic mass are shaped so as to prevent the cylinder deforming inwardly under axial compression of the cylinder.

The seismic mass 13 is held by a tension member in the form of a bolt 15 secured to the base plate 3. Whilst in a non-illustrated embodiment the tension member is provided by an enclosure or can, other forms of tension member will be readily apparent to those skilled in the art. The bolt 15 bears on the seismic mass 13 via an elastomeric member which is most easily provided by a pad 17 of rubber of rubber-like material. The seismic mass 13 itself Is so shaped that a generally disc shaped portion 19 bears on a second end face 21 of the compliant cylindrical member 7. In use, acceleration forces acting on the seismic mass 13 bring about a displacement which is coupled to the cylindrical member 7. Without the tension member 15, there would be no coupling of displacement to the cylindrical member 7 where the sense of acceleration is such as to urge the disc shaped portion 19 out of contact with the second end face 21. In effect, the tension member 15 preloads the cylindrical member 7 with an initial displacement. Depending on the range of acceleration expected, the preload may be varied by altering the level of tension provided by the tension member 15.

The cylindrical member 7 is wound with a length of optical fibre 23. The winding may be single or multi layered The optical fibre 23 is wound about an external surface 25 of the cylinder 7 and may be secured mechanically, adhesively or through another or combination of techniques to ensure that as completely as possible the possibility of slippage between the fibre 23 and the cylinder surface 25 is minimised.

It will be appreciated that the optical fibre 23 constrains the cylindrical member 7 against circumferential deformation thus generating a level of hoop stress in the fibre 23. This hoop stress alters the physical characteristics of the optical fibre 23 such that by incorporating the accelerometer in one arm of an optical interferometer (FIG. 3) a stress value proportional to the acceleration acting on the accelerometer 1 can be determined.

In this arrangement compression of the compliant cylinder by displacement of the seismic mass effectively increases the stress in the optical fibre; conversely expansion of the compliant cylinder decreases stress in the optical fibre.

FIG. 3 shows the accelerometer 1 as an element in an optical interferometer 30 used to determine acceleration. In this embodiment there is provided a source of laser light 31 a coupler 32, coupling two arms 33,34 of fibre optic cable and an output to a display 35. One of the arms 33 contains the accelerometer 1 whilst the other arm 34 includes a polarisation corrector 36. The operation of such an interferometer 30 will be apparent to those skilled in that art just as those skilled in the art will recognise that this interferometer is purely Illustrative and that the accelerometer of the invention may be deployed in a host of interferometer applications.

Whilst those skilled in the art will recognise the improvements in resistance to off-axis acceleration effects conferred by the above described embodiment, further steps may be taken to minimise the detrimental effect of such inputs. Accordingly, a shim may be added between the tension member and the seismic mass to resist out of axis inputs whilst maintaining on-axis sensitivity.

Referring now to FIG. 4, in a further embodiment the seismic mass 11 is located coaxially inside two separate cylinders 2, 6 of compliant material. Each cylinder is surrounded by a separate length of optical fibre 4 and 7. The end faces of the two compliant cylinders nearest the centre of the sensor each rest on a bearer member (in this case in the form of a circumferential protrusion from the mass) extending outwardly from the seismic mass 19. Whilst in the embodiment shown a single bearer member is shown bearing on one end of each cylinder, clearly two separate bearer members may be employed to bear on each of the respective complaint cylinders. Nor is it essential that the bearer member be strictly uniform in form around the circumference of the mass, merely that it adequately transfers the effects of the axial displacement of the mass to each of the complaint cylinders. The opposite end of each compliant cylinder is in contact with separate support rings (or more generally end support members) 5 which are themselves attached to two end plates 3, one of which is situated at either end of the accelerometer. A tensioning device 15 is used to pull the two end plates together so that when the accelerometer is stationary both of the compliant cylinders are in a state of compression. In this diagram the tensioning device is shown in the form of a bolt 15 but, as explained previously, it may also take other forms.

As will be recognised by those skilled in the art, acceleration in one axial direction will increase the axial compression in one compliant cylinder and decrease it in the other, and so the effects induced in the two fibre coils 4,7 will be equal in magnitude but opposite in sense. As again will be recognised by those skilled in the art if the two fibre coils are used in two different arms of an interferometer, 33 and 34 in FIG. 3, the changes in the two coils will add together and so the sensitivity of the accelerometer will be twice as a large as if a single coil were used in one arm of the interferometer. This embodiment also has the advantage that if the accelerometer experiences an acceleration orthogonally to the axis, any signals induced in the two fibre coils will tend to cancel out if they are used in separate arms of an interferometer.

As in the earlier embodiment, in this arrangement compression of a compliant cylinder by displacement of the seismic mass effectively increases the stress in the optical fibre wound around the cylinder; conversely reducing the compression applied to a compliant cylinder decreases stress in the optical fibre. It is noted that whilst it may be convenient for the seismic mass and surrounding compliant cylinder to have substantially circular cross-sections, this is not essential for the operation of the apparatus and other cross-sections are equally possible including, for example, oval.

Any range or device value given may be extended or altered without losing the effect sought, as will be apparent to the skilled person for an understanding of the teachings herein.

The invention claimed is:

1. A fibre optic accelerometer comprising a seismic mass coaxially constrained within a cylinder of compliant material, arranged to prevent the cylinder deforming inwardly under axial compression, the cylinder being circumferentially wound with optical fibre such that axial compression of the cylinder by the seismic mass increases stress in the optical fibre.

2. An accelerometer according to claim 1, wherein the seismic mass includes a disc shaped portion.

3. An accelerometer according to claim 1, wherein the seismic mass is secured by a tension member to a base plate.

4. An accelerometer according to claim 3, wherein a spacer is provided between the cylinder and the base plate.

5. An accelerometer according to claim 4, wherein the spacer is integral with the base plate.

6. An accelerometer according to claim 3, wherein the base plate is integral with a platform or structure.

7. An accelerometer according to claim 1, wherein the optical fibre is wound in a single layer.

8. An accelerometer according to claim 1 in which the seismic mass is coaxially constrained within first and second cylinders of compliant material, each cylinder being circumferentially wound with optical fibre.

9. An accelerometer according to claim 8 in which the seismic mass comprises a first circumferentially located bearer member arranged to bear on an end of at least one of the compliant cylinders.

10. An accelerometer according to claim 9 in which the first circumferentially located bearer member is arranged to bear on respective ends of both of the compliant cylinders.

11. An accelerometer according to claim 9 comprising a second circumferentially located bearer member arranged to bear on an end of a second of the compliant cylinders.

12. An optical interferometer comprising an accelerometer according to claim 1.

13. A fibre optic accelerometer according to claim 1, wherein said compliant material is rubber or rubber like.

14. A method of measuring acceleration comprising providing a seismic mass coaxially constrained within a cylinder of compliant material, the cylinder being circumferentially wound with optical fibre, axially displacing the seismic mass so as to compress the cylinder thereby increasing the stress induced in the optical fibre, and determining a stress value in the optical fibre.

* * * * *